INVENTOR
SIDNEY BROWNE
BY Hurvitz & Rose
ATTORNEYS

INVENTOR
SIDNEY BROWNE
BY Hurvitz + Rose
ATTORNEYS

United States Patent Office 3,422,357
Patented Jan. 14, 1969

3,422,357

FREQUENCY SHIFT DIVERSITY RECEIVER WITH OUTPUT DETERMINED BY MAJORITY OF INPUTS

Sidney Browne, Falls Church, Va., assignor to Page Communications Engineers, Inc., Washington, D.C., a corporation of Delaware Filed Sept. 9, 1964, Ser. No. 395,188
U.S. Cl. 325—320 9 Claims
Int. Cl. H04b *1/16*

ABSTRACT OF THE DISCLOSURE

A multiple channel diversity receiver, each channel for processing a separate signal whose frequency is representative of one of a pair of levels of information, the transmitted signals being separated in frequency from one another to reduce the probability of simultaneous fading or interference at each signal frequency, each signal transmitted at any given instant of time containing the same information, in which each channel normally develops an output indication representative of the absence of incoming signal unless and until its respective signal frequency is detected. In the event of interference or fading at a particular signal frequency, an erroneous output indication is developed in the receiver channel for that frequency, but the decision as to the level of information transmitted is based upon agreement of output indications of a majority of the receiver channels, to substantially reduce error in the presence of fading or interference. Should there be no majority agreement, the decision regarding the information level transmitted is based upon a predetermined selection of level in anticipation of such an exigency.

The present invention relates generally to multiple channel or diversity receivers for utilization with transmission links susceptible to fading and interference. More particularly, the present invention relates to a multiple diversity receiver for information transmitted as groupings of marks and spaces wherein a decision, as between a mark or space, is made in response to a majority agreement of the indications detected by the various diversity channels or is arbitrarily chosen to be one of the indications where no majority agreement is indicated.

Accuracy of existing radio frequency, shift keying, telegraphy links, etc. is frequently impaired because of the large amount of high frequency interference that results from the crowded RF spectrum. To overcome this impairment, diversity transmission links wherein plural carrier frequencies are employed have been developed.

Two of the more common types of radio diversity reception are known as "selector diversity" and "combiner diversity." In the former system, the strongest signal available in any diversity channel is automatically selected. With strong interference, however, this system often fails to function properly because interference appears as a signal to the receiver.

In, for instance, an FSK combiner system, amplitudes of the detected signals are combined, i.e. linearly or nonlinearly added. The sums of the detected mark and space amplitudes are compared for each element and the largest sum is utilized to determine the signal information, i.e. whether it is a mark or space. If the sum of the interference is stronger than the sum of the received information signals, an erroneous indication may be derived. It can be shown statistically that, when using a diversity combiner in the presence of an interfering signal, increasing the number of diversity channels does not increase the probability that the correctly detected signal is correct. This is because both the information signal and the interfering signal are added together indiscriminately. Thus, the error rates for both the "selector diversity" and "combiner diversity" system are rather high in the presence of an interfering signal. While other approaches to the problem of correct binary data transmission have been utilized, e.g. parity or redundancy checks, they all are subject to certain shortcomings, particularly in regard to equipment complexity.

In accordance with the present invention, a system is provided having greater accuracy than the "selector diversity" or "combiner diversity" receivers, particularly in the case of interfering signals. In such a system, the information signals from the various diversity reception branches are routed to a selector network wherein a majority vote of the information signals is taken. In the FSK realization of the present invention which is illustrated and described subsequently, the majority vote is obtained by considering as information both the presence or absence of a signal. Thus, if a particular signal is designated as a mark, and that signal is not detected, a space indicating signal is derived. Detection of the particular signal results in derivation of a mark indicating signal. Thus, even though, for example, only two signals are transmitted, the system receives the same amount of information as if four channels were transmitting. This greatly increases accuracy while maintaining simplicity and low cost.

The mark and space indicating signals derived, as indicated, alone form the basis on which a majority decision is made. It is to be noted that, with a majority decision system, strong interference on one channel does not override the correct signals detected by the other channels as in the case of a diversity combiner.

In accordance with an important aspect of the invention, if no detected signal is in the majority, the system derives an output signal previously selected by the system designer and programmed into the apparatus. Thus, in a four channel diversity system employing two carrier frequencies, if marks are detected in two channels and spaces are detected in the other two channels for a particular element, so that neither marks nor spaces are in the majority, a mark (or a space) is automatically generated by the system. This increases the number of correct elements received, as well as the number of incorrect elements. An alternative procedure is possible wherein an error indication is derived when no detected signal is in the majority. The increase in correctly received elements arises because there is a 0.5 probability that the prior signal has the desired value.

Mathematically, the probability of a correct decision, Pc, being derived for each channel may be expressed as $Pc=1-0.5P_i$, where $P_i$ is the probability of the interfering signal amplitude exceeding the desired signal amplitude, provided there is no error in the receiver, a reasonable assumption. The 0.5 factor occurs because, for half of the elements, the interfering signal corresponds with the transmitted signal. Thus, if a mark is transmitted from a frequency shift key transmitter, and interference arises on the mark frequency, there is still 0.5 $P_i$ probability that a mark indication will be derived. This is because half of the time the interference adds to the signal to cause the derivation of a correct mark signal by the receiver. Since $Pc=1-0.5P_i$, it follows that error probability, Pe, for any channel is $Pe=0.5P_i$.

The total number of decisions made may be expressed as $(Pc+Pe)^n$, where $n$ is the total number of mark and space indications that can be derived at the receiver, e.g. in a four-channel, four-frequency shift key diversity system, $n=4$. With $n=4$, this expression expands to $Pc^4+4Pc^3Pe+6Pc^2Pe^2+4PcPe^3+Pe^4$. The $(Pc^4+4Pc^3Pe)$ and $(4PcPe^3+Pe^4)$ terms represent the probability of system accuracy and error, respectively. The middle term, $6Pc^2Pe^2$ indicates the probability of the system deriving neither a correct nor an incorrect indication. Half of this term is added to each of the accurate and error terms, as a result of the prior decision. Thus, the total probabilities of system accuracy and error are expressed as $(Pc^4+4Pc^3Pe+3Pc^2Pe^2)$ and $(Pe^4+4Pe^3Pc+3Pc^2Pe^2)$, respectively. It is to be noted that system accuracy is increased exponentially as the number of channels is increased. This is evident from the binominal expansion of $(Pc+Pe)^n$ for larger values of $n$.

Taking $Pe=0.1$ and $Pc=0.9$ as typical values (actually they are larger error values than will normally be encountered) it is seen that the probabilities of system accuracy and error are 0.9720 and 0.0280, respectively, for a four-channel system. Thus, with the present invention, the probability of error is decreased by approximately 75 percent from 0.1 to 0.0280, with a four-channel transmission system. The above analysis assumes no correlation in fading and interference between the four signals. The latter assumption is true in a typical transmission system, e.g. in a frequency shift key diversity system, if the transmitted frequencies differ by at least 800 cycles per second. In the present invention, 800 to 1000 cycles per second spread between adjacent channels is maintained so that the analysis rendered above applies to these equipments.

Another feature of the invention resides in its adaptability to existing low level frequency shift key receivers that do not include any amplitude limiting. Adaptability results because the system decision is amplitude insensitive being based solely on reception of signals having an amplitude above a specific threshold level. There is no amplitude comparison between signals deriving from the several direvsity channels.

It is accordingly an object of the present invention to provide a new and improved multiple diversity receiver for digitally coded signals.

Another object of the invention is to provide a multiple diversity receiver wherein element, that is, mark and space, decisions are made in response to a majority vote of binary indications deriving from the presence and absence of information signals, particularly in the presence of interference.

A further object of the invention is to provide a frequency shift key diversity receiver having greater accuracy than existing diversity receivers responsive to frequency shift key signals.

An additional object of the invention is to provide a multiple diversity receiver wherein element decisions are normally made in response to a majority vote of binary indications deriving from the presence and absence of information, but wherein an element may be derived on an arbitrary basis, if no majority exists.

A further object is to provide a new and improved detection system for frequency shift key diversity receivers, which system is readily adaptable to existing equipment.

The above and still further objects, features and advantages of the present invention will become apparent upon consideration of the following detailed description of one specific embodiment thereof, especially when taken in conjunction with the accompanying drawings, wherein.

Figure 1:
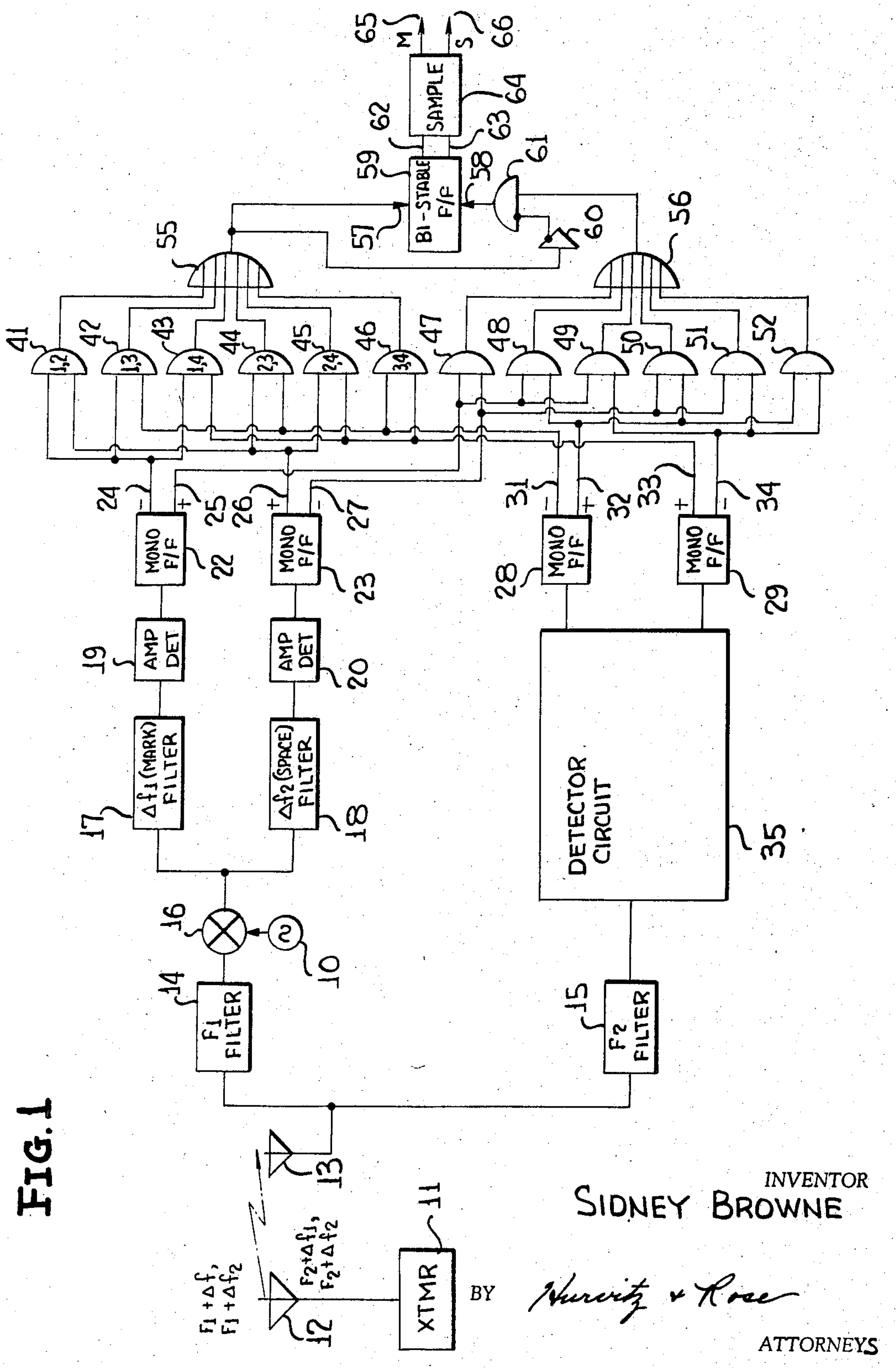
FIGURE 1 is a circuit diagram of a preferred embodiment of the present invention utilizing an even number of diversity channels.

Reference is now made to FIGURE 1 of the drawings wherein frequency shift key diversity transmitter 11 supplies antenna 12 with signals from a pair of diversity channels having center or carrier frequencies $F_1$ and $F_2$. In response to mark and space signals at the transmitter, the center frequencies are varied from $F_1$ and $F_2$, by audio frequencies $\Delta f_1$ and $\Delta f_2$, respectively. Thus, if a mark telegraphy indication is derived at the transmitter 11, frequencies $(F_1+\Delta f_1)$ and $(F_2+\Delta f_1)$ are generated while frequencies $(F_1+\Delta f_2)$ and $(F_2+\Delta f_2)$ are generated by the transmitter when the intelligence is a space. Each of the transmitted frequencies is separated by at least 800 cycles per second, when standard transmission phenomena are utilized, so that fading on each frequency is independent of fading of the other frequencies. If ionoscatter transmission is employed, each frequency should be separated by at least 6,000 cycles per second to attain independent fading characteristics.

The two frequencies are transmitted between antennae 12 and 13, via a radio link. Interference in one or more channels results in reception at antenna 13 of information frequencies when the particular information frequencies are not actually being transmitted. Fading, to the contrary, causes cancellation of frequencies derived from antenna 12, so that a transmitted information frequency is not received at antenna 13. As a result, the signals at antenna 13 are sometimes not an accurate indication of the information frequencies derived from transmitter 11. Usually only one or two of the information frequencies is at any time subjected to sufficient fading or interference to cause erroneous reception of marks and spaces at antenna 13.

The signals derived from antenna 13, are applied to bandpass filters 14 and 15, having center frequencies $F_1$ and $F_2$, respectively. Frequencies $F_1$ and $F_2$ are sufficiently separated so that the output of filter 14 includes no information regarding $(F_2+\Delta f_1)$ and $(F_2+\Delta f_2)$ and vice versa regarding filter 15. Frequencies $(F_1+\Delta f_1)$ and $(F_1+\Delta f_2)$ derived from filter 14 are heterodyned with the output frequency $F_1$ of local oscillator 10 in mixer 16. Derived from mixer 16 are audio frequencies $\Delta f_1$ and $\Delta f_2$, which are applied in parallel to bandpass filters 17 and 18. Filters 17 and 18 are constructed so that an A.C. signal is derived from the former only when $\Delta f_1$ is applied thereto and an A.C. signal is derived from the latter only when $\Delta f_2$ is applied to it. The output signals of filters 17 and 18 are applied to amplitude detectors 19 and 20, respectively.

Under perfect operation conditions, the signals derived from detectors 19 and 20 are assumed to be of a zero or a fixed positive value. When transmitter 11 is marking, $(F_1+\Delta f_1)$ being transmitted, the outputs of detectors 19 and 20 are designed to generate positive and zero voltages, respectively, assuming ideal transmission. In contrast, a transmitted carrier of $(F_1+\Delta f_2)$ is supposed to result in the derivation of zero and positive voltages from detectors 19 and 20, respectively. In actuality, the output signals of detectors 19 and 20 are not usually of constant voltage, but are subjected to considerable amplitude variation due to fading and/or interference occurring during transmission of a single telegraphy information element. The elements and systems thus far described are in prior art. It is the purpose of the remaining circuitry which forms the subject matter of the present invention to determine the transmitted element despite the variations in signals resulting from interference.

The output signals from detectors 19 and 20 are respectively applied to monostable flip-flops 22 and 23. The term "monostable flip-flop" is employed herein to designate a flip-flop which is in its unstable state in the presence of an input signal and remains in this state only so long as the input signal is applied and returns to its stable state as soon as the input or initiating signal is removed. The flip-flops are arranged so that their output voltages are respectively at negative and positive levels under quiescent conditions. Only when positive voltages are applied to them are flip-flops 22 and 23 activated out of their quiescent conditions, into a transitory condition. Thus, under conditions of no interference, a mark at the trasmitter always results in flip-flop 22 being activated into the transitory condition whereby a positive voltage is derived from lead 24 and a negative voltage is derived from lead 25. Flop-flop 23 remains in the quiescent state so that the voltages on its output leads 26 and 27 are positive and negative, respectively.

In similar manner, monostable flip-flops 28 and 29 derive positive and negative voltages, respectively, indicative of $(F_2+\Delta f_1)$ and $(F_2+\Delta f_2)$ being supplied to filter 15 by antenna 13. Thus, positive and negative voltages are transitorily derived from output leads 31 and 32 of flip-flop 28 only when $(F_2+\Delta f_1)$ is received while outputs 33 and 34 of flip-flop 29 are positive and negative for a predetermined time period after reception of $(F_2+\Delta f_2)$. Under quiescent conditions, leads 31 and 34 are normally maintained at negative voltages and leads 32 and 33 at positive voltages. The detector circuit 35 that drives flip-flops 28 and 29 is virtually identical to the corresponding circuit for driving multivibrators 22 and 23, except for the frequency of the local oscillator which is adjusted according to frequency $F_2$. As will be explained more fully subsequently two antennas may be employed for antenna 13 and only frequencies $f_1$ and $f_2$ transmitted. In such a case a single local oscillator may be employed for both the front ends of both receivers.

It is thus seen that positive voltage on any of leads 24, 26, 31 or 33 indicates that the particular frequency signal received by its associated antenna is a mark while a positive voltage on any of leads 25, 27, 32 or 34 is a space indication for the particular frequency signal received by its associated channel. This may be realized by again assuming perfect transmission of $(F_1+\Delta f_1)$ which results in activation of monostable flip-flop 22 so lead 24 is positive while flip-flop 23 stays in its quiescent condition, whereby the voltage on lead 26 is positive. Thus, the failure to receive $(F_1+\Delta f_2)$ is considered as one of the two possible mark indications for the $F_1$ channel, the other being the actual reception of $(F_1+\Delta f_1)$.

The signals derived from flip-flops 22, 23, 28 and 29 are applied to a logic network including AND gates 41–52 as well as OR gates 55 and 56. The mark indicating voltages derived from the flip-flops, the signals on leads 24, 26, 31 and 33, are combined by gates 41–46 and 55 such that a binary one signal is derived from the latter only if two mark indications are being simultaneously received on any of $(F_1+\Delta f_1)$, $(F_1+\Delta f_2)$, $(F_2+\Delta f_1)$ or $(F_2+\Delta f_2)$. This is accomplished by combining every pair combination of leads 24, 26, 31 and 33 in AND gates 41–46 and coupling the AND gate output leads to OR gate 55. In a similar manner, the space indicating voltages on leads 25, 27, 32 and 34 are fed to AND gates 47–52 and OR gate 56 whereby the latter generates a binary one only when two or more space indications are simultaneously received on any of the four information frequencies.

The mark and space indicating pulses derived from OR gates 55 and 56 are supplied to separate mark and space input terminals 57 and 58 of bistable flip-flop 59, the latter being supplied through an inhibit gate 61. In response to the marks or space pulses, flip-flop 59 is activated so that a positive voltage is generated on output lead 62 or 63 to indicate a marking or spacing condition, respectively, at the transmitter. If a mark signal is detected on at least three of the four information channels and a space on one or none of the channels, the positive voltage generated by OR gate 55 sets flip-flop 59 to its mark state, whereby a positive, binary one voltage is derived on lead 62. No output is produced by OR gate 56 under these circumstances because none of gates 47–52 is enabled when none or only one of their inputs is supplied with a space indicating voltage. If the opposite condition prevails, whereby space indications are detected on at least three channels and a mark indication from no more than one channel, flip-flop 59 is activated to its space state in response to the voltage derived from OR gate 56.

The inhibit gate 61 in the lead between OR gate 56 and terminal 58 is controlled by an inhibit signal derived from gate 55 through inverter 60. If gate 55 generates a positive pulse, indicating at least two mark signals, the gate voltage is removed from inhibit gate 61 and space pulses to terminal 58 are blocked. It is thus seen that by arbitrary selection, a mark output is always produced by flip-flop 68 when two receiver diversity channels respond to mark signals and the other two receiver channels respond to space signals; i.e. a mark is derived from flip-flop 68 if neither the marks nor spaces are in the majority.

The detection of an equal number of mark and space signals may be employed for purposes other than generation of a specific binary element. For instance, if the decision circuit of the invention is employed in an ARQ system, an ambiguous response of the circuit may be employed to generate a request for repeat of transmission. The system of the present invention is particularly applicable to such use since such use eliminates circuitry normally required in ARQ systems for conversion from the five-level code received, to the seven-lead code employed for requests for repeat. In such a system, the output signals from gates 55 and 56 may be applied through an AND gate to the repeat control circuits.

To determine the value of each telegraphy element, the output signals of bi-stable flip-flop 59 are sampled by circuit 64 after each mark or space decision is made by the logic circuitry including gates 41–52, 55, 56 and 61 and flip-flop 59.

To provide a better understanding of the manner by which the present invention operates, three examples will be considered. In each example, it is assumed that transmitter 11 is marking so only frequencies $(F_1+\Delta f_1)$ and $(f_2+\Delta f_1)$ are derived from antennae 12. Initially, it is assumed that sufficient fading oucurs on frequency $(f_1+\Delta f_1)$ to prevent activation of monostable flip-flop 22 by detector 19 and the other three flip-flops 23, 28 and 29 are properly activated. In consequence, positive voltages are derived on leads 25, 26, 31 and 33 while a negative voltage appears on each of leads 24, 27, 32 and 34. In response to the positive voltages on leads 26, 31, and 34, a binary one is generated by each of AND gates 44–46. In contrast, a binary zero is derived from each of AND gates 41–43 and 47–52 because both of the inputs thereto are not simultaneously positive. In response to the signals deriving from gates 44–46, OR gate 55 supplies a binary one signal to input terminal 57 to activate flip-flop 59 into a mark status whereby positive and negative voltages appear on leads 62 and 63, respectively. It is thus seen that the correct signal is derived from flip-flop 59 even though significant fading occurred on $(F_1+\Delta f_1)$.

For the second example, assume that sufficient interference occurs on $(F_1+\Delta f_2)$ to cause erroneous activation of flip-flop 23 while each of flip-flops 22, 28 and 29 is correctly energized. In consequence, positive voltages are derived on leads 24, 27, 31 and 33, while negative voltages are generated on leads 25, 26, 32 and 34. In response to these voltages, binary ones are generated by AND gates 42, 43 and 46 and binary zeros by AND gates 41, 44, 45 and 47–52. The AND gate output signals are applied through OR gates 55 and 56 to activate bi-stable flip-flop 59 into its mark state. It is noted that flip-flop 59 is correctly energized regardless of the amplitude of the interfering signal on frequency $(F_1+\Delta f_2)$. This is in sharp contrast with the prior art "selector diversity" and "combiner diversity" receivers in which an interfering signal of large magnitude frequently results in erroneous indications.

As a third example, consider the situation where $(F_1+\Delta f_1)$ fades and interference occurs on $(F_1+\Delta f_2)$ so that flip-flops 22 and 23 are in the incorrect state while flip-flops 28 and 29 are correctly activated. Thereby, positive voltages are generated on leads 25, 27, 31 and 33 and negative voltages appear on leads 24, 26, 32 and 34. In response to these voltages, binary ones are derived from AND gates 46 and 47 which drive OR gates 55 and 56 so binary ones are generated by both OR gates. The output signal from gate 55, inverted by inverter 60, blocks inhibit gate 60 so that only terminal 57 of flip-flop 59 receives an input pulse. This binary one causes flip-flop 59 to be energized in the mark condition during the sampling interval. Thus, a mark indication is derived from sampler 64 even though one-half of the received information is erroneous.

It is thus seen that if one-half of the transmitted information is erroneously received, the receiver makes arbitrary decision that a mark occurred at the transmitter. While an arbitrary decision is statistically correct only one-half of the time, the resulting error rate in practice is normally low enough to prevent the derivation of unintelligible telegraphy messages. Because the arbitrary decision is correct one-half of the time, however, the system accuracy is actually increased nearly two fold over the situation where such a decision is not made at all.

Figures 2, 3:
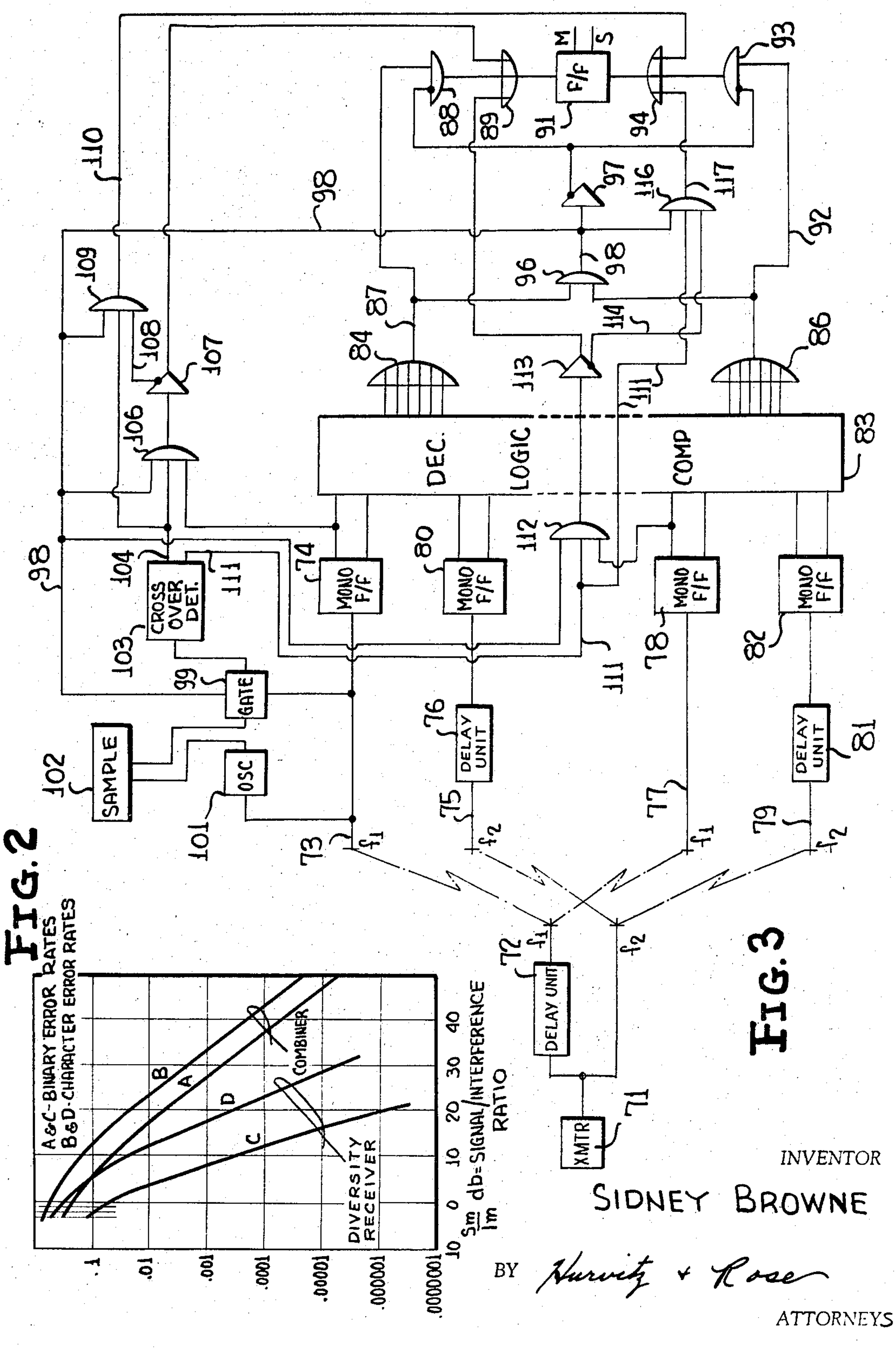
FIGURE 2 is a graph showing comparative results of the present system and of a prior art device.
FIGURE 3 is a circuit diagram of an embodiment of the invention for use as a multiple time diversity receiver.

To demonstrate the thoretical improvement in accuracy attained with the present invention in comparison with the prior art "diversity combiner" device, reference is made to FIGURE 2. In this figure. In this figure, signal-to-interference ratio is plotted in decibels against error probability wherein the bit and character error rates of the prior art combiner are shown by plots A and B, while the bit and character error rates of the system illustrated by FIGURE 1 are shown by plots C and D. The character error rates are on the assumption of a standard five bit per character teletype signal. These plots demonstrate that the present system provides considerable improvement in accuracy over the prior art device in the region of practical character error rates. For example, with a signal to interference ratio of 12 decibels, the prior art combiner has an error rate of 1 in 10 characters, compared to a character error rate of 1 in 100 with the present invention. Thereby, a significant accuracy improvement of eleven decibels is attained with the present invention over the prior art combiner.

While the present system has been described in conjunction with a four-channel diversity system wherein four information frequencies are employed, it is to be understood that more than four channels may be employed and that system accuracy increases greatly with added channels. Increase in accuracy with increases in the number of channels is greater in the present system than with the combiner and selector receiver systems because the effect of one highly interfering frequency is reduced.

The system has also been described as employing a different frequency for each channel and a single antenna. The transmitter may be simplified by employing only two frequencies, a mark frequency and a space frequency, while two or more receiving antennas are employed. The various antennas are located such that the paths between the single transmitter antenna and the various receiving antennas are subject to independent fading and interference patterns. The two types of systems are both well known in the art and factors independent of the present invention control choice of one system over the other. It is also to be understood that the present invention is adaptable to any type of multiple channel receiver, and is not necessarily limited to diversity, frequency shift key. Specifically, the principles of the invention may be utilized with space diversity, other frequency diversity, time diversity and angle diversity systems, e.g. as with troposcatter systems, as long as interference and fading effects are the primary error sources as is usually the case with well designed circuits of the above types.

The system of the present invention may be applied with particularly rewarding results to time diversity systems. At present, normal combiner or diversity channel techniques cannot be employed in time diversity systems since the analog information is not available simultaneously in all diversity channels. Specifically, in time diversity systems, the information is digitized and delayed in one channel at the transmitter and in the other channel at the receiver. Thus, combiner or space diversity systems which can operate only on analog information cannot be employed. However, since the system of the present invention utilizes only digital signals in making a signal selection, the present invention may be employed to permit multichannel time diversity operation.

In one form of conventional time diversity system a local oscillator is synchronized, by the received pulse train, to the transmitted bit rate. Thus, the time of beginning and ending of each bit received is known. The center portion of each bit received without delay is sampled, via a sampling gate, by a crossover network. If, during the sampling period the signal does not cross a voltage threshold situated between the mark space signal levels, the information is considered correct and is employed to produce signal readout. If the signal crosses the threshold, it is considered ambiguous and for two seconds, the information on the other channel, i.e. the channel delayed at the receiver, is employed to produce the output signal.

In applying the system of the present invention to a time diversity system, four channels of information are transmitted, two delayed at the transmitter and two delayed at the receiver. The four channels of information are treated by the decision logic computer of the present invention as in FIGURE 1. If, however, no decision is made, i.e. two marks and two spaces are detected, then the sampling technique of the prior art time diversity system described above is employed. In this case, however, real time pulses must be sampled. Therefore, one channel of signals delayed at the transmitter is sampled. If the sample crosses the threshold then the other channel delayed at the transmitter is employed to produce the output signal.

Referring now specifically to FIGURE 3 of the accompanying drawings, there is provided a transmitter 71 for transmitting a first frequency $f_1$ via a two-second delay 72 and for transmitting an undelayed signal, frequency $f_2$. The signal of frequency $f_1$ is developed, by a receiver, on a lead 73 and applied to a monostable flip-flop 74. The signal of frequency $f_2$ is developed on a lead 75 and applied via a two-second delay unit 76 to a second monostable flip-flop 80. Signal $f_1$ is also developed on a lead 77 and applied to a further monostable flip-flop 78 while the frequency $f_2$ is received on another lead 79 and applied via a two-second delay unit 81 to a final monostable flip-flop 82. The leads 73 and 75 are associated with a receiving system which is located relative to the receiving system with which the leads 77 and 79 are associated, such that the fading and interference patterns are sufficiently different and that the interference and fading patterns vary independent of one another.

The monostable flip-flop 74, 80, 78 and 82 of FIGURE 3, correspond with the units 22, 23, 28 and 29 of FIGURE 1. The output leads from these monostable flip-flops are fed to a decision logic computer 83, of exactly the type illustrated in FIGURE 1. The decision logic computer 83 includes as a first output element, a six input OR gate 84 and as a second output element, a second six input OR gate 86.

Thus far, the operation of the device is identical with that illustrated in FIGURE 1. Output lead 87 from OR gate 84 is applied through an inhibitor gate 88 and OR gate 89, connected in series, to a flip-flop 91 which corresponds with the bi-stable flip-flop 59 of FIGURE 1. Output lead 92 of the six input OR gate 86 is also applied to the flip-flop 91 via an inhibit gate 93 and an OR gate 94, connected in series. The leads 87 and 92 are also connected as the two inputs to an AND gate 96 which is coupled through an inverter amplifier 97 to the inhibit leads of the inhibitor gates 88 and 93. Thus, the flip-flop 91 produces a mark or space signal when the decision logic computer makes a decision but is prohibited from making a decision when both leads 87 and 92 have output signals developed thereon.

When the decision logic computer does not make a decision, the AND gate 96 develops a signal on a lead 98, which is applied to a sample gate 99. The sample gate 99 forms a part of the prior art time diversity system in that it gates a center portion of an input pulse appearing on lead 73 to a crossover detector 103 which detector determines whether, during the sampling period, the signal crosses a prescribed threshold provided by the detector.

Describing the system of the prior art briefly, there is provided an oscillator 101 which is connected to input lead 73 so that the oscillator is synchronized by the incoming pulse train. The oscillator signals are applied through a sampling device 102 to the gate 99. The sampling device passes the center portion of each pulse developed by the oscillator 101 to the gate 99 so that only a central portion of the incoming signal is gated through the gate 99 to a crossover detector 103. If the detector 103 does not detect a crossover, it develops a signal on a lead 104. The lead 104 forms a first input lead to an AND gate 106 which receives further input signals from the lead 98 and from the mark output lead of the monostable flip-flop 74. Thus, the gate 106 passes a signal if the following three conditions exist: the decision logic computer has not made a decision, the crossover network has not detected a crossover during the sample period and the flip-flop 74 indicates a mark signal has been received. Under these conditions, the gate 106 develops a positive pulse which is passed through an amplifier 107 to the OR gate 89, thus actuating the flip-flop 91 to indicate a mark.

If the flip-flop 74 is in a space condition, then the amplifier 107 develops a positive signal on an inverter output lead 108 which is applied to an AND gate 109. The AND gate 109 is also fed from leads 98 and 104 and develops a signal on its output lead 110 if the following three conditions exist: The decision logic computer has not made a decision, the crossover network has not detected a crossover and the monostable flip-flop 74 is in the space condition. The lead 110 is applied to the OR gate 94 and, when a pulse is developed thereon, the flip-flop 91 produces a space signal for the system.

If a crossover is detected on the lead 73 during a sample period, the crossover network 103 develops a signal on its output lead 111. This lead is applied as one input to an AND gate 112 which also receives an input pulse from the lead 98 and an input pulse from the mark signal lead of monostable flip-flop 78. Thus, the AND gate 112 passes a signal if the decision logic computer does not make a decision; the crossover detector 103 has detected a crossover; and the flip-flop 78 has received a mark signal. The signal developed by the AND gate 112 under these conditions is passed through an amplifier 113 to the OR gate 89, thus causing the flip-flop 91 to assume a mark condition. If the flip-flop 78 has detected a space signal, then amplifier 113 produces a positive pulse on its inverter output lead 114. This lead is applied as one input to an AND gate 116 which also receives an input from the lead 98 and from the lead 111 of the crossover network. Thus, the AND gate 116 produces an output pulse if the decision logic computer has not made a decision; the crossover network has detected a crossover; and the flip-flop 78 is in the space condition. The AND gate 116 develops a signal on its output lead 117 which is applied through the OR gate 94 to the flip-flop 91 to produce a space signal.

As in the prior systems, if the crossover network 103 detects a crossover, the signal is maintained on the lead 111 for two-seconds. However, if the decision logic computer makes a decision at any time during this two-second interval, the voltage is removed from the lead 98 and the system reverts to normal decision logic operation even though the crossover detector maintains a crossover signal on the lead 111. Thus, the prior art portion of the system is gated in only when the system of the present invention does not make a decision. It is apparent that a high degree of reliability is obtained by the apparatus of the present invention as applied to time diversity systems since, on top of the very high degree of reliability that is obtained by the four-channel diversity system described, the apparatus of the invention employs the inherent accuracy of the prior art time diversity apparatus.

The present system may also be modified to include a variable decision level detector circuit, of the type illustrated by FIGURE 7 of U.S. Patent 2,999,925. One of the detectors, each of which enables accurate presence and absence decisions to be made for one information frequency despite fading, is substituted for each of monostable flip-flops 22, 23, 28 and 29 of FIGURE 1 on 74, 78, 80 and 82 of FIGURE 2. The rest of the circuitry is as described supra, except that each of AND gates 47–52 generates a positive binary one signal when the inputs thereto simultaneously exceed a predetermined negative level.

While I have described and illustrated one specific embodiment of my invention, it will be clear that variations of the details of construction which are specifically illustrated and described may be resorted to without departing from the true spirit and scope of the invention as defined in the appended claims.

I claim:

1. A frequency shift key diversity receiver responsive to N channels, each of said channels being responsive to a signal at a different frequency and susceptible to fading and interference, wherein $N>3$, said receiver comprising N receiver frequency detecting channels, one for each of said frequencies, each of said receiver channels including means for deriving mark and space indications in response to the frequency of its respective signal, and means responsive to said indications for deriving mark and space signals in accordance with the majority of said indications.

2. The receiver of claim 1 wherein each of said receiver channels is responsive to low level signals and includes a bandpass filter for the frequency associated with said channel, means for detecting the amplitude derived from each of said filters, and means responsive to the detected amplitudes for deriving said indications.

3. A frequency-shift-key diversity receiver responsive to N channels, of transmitted signals, each of said channels being susceptible to independent fading and interference, said receiver comprising N frequency-detecting channels, one for each of said channels of transmitted signals, each of said receiver channels including means for deriving mark and space indications in response to the detected frequency of its respective signal, and means responsive to said indications for deriving mark and space signals in accordance with the majority of said indications.

4. A digital decision device for a diversity receiver system having a plurality of channels, wherein each of said channels is responsive to signal of frequency separated from the frequency of signals to which others of the channels are responsive to render each signal frequency susceptible to interference and fading independently of the other signal frequencies, and wherein all of said channels are simultaneously responsive to the same signal information in binary form at the respective signal frequencies accepted thereby, said device comprising means in each receiver channel for generating a binary signal level representative of the present binary value of the signal information received by the respective channel at the signal frequency to which that channel is responsive, and means responsive to the signal levels generated by said generating means in the several channels for developing an indication of said present binary value of the received signal information consonant with that signal level generated in the majority of said channels.

5. The combination of claim 4 wherein said indication developing means includes means for selecting a predetermined value as said present binary value when neither level of said generated binary signal is in the majority.

6. A diversity receiver system responsive to a plurality of transmitted signals each containing the same binary information at a respective different frequency, comprising a separate signal channel for each of said signal frequencies; each channel including means for generating a signal at a level representative of that value of the binary information at the respective transmitted signal frequency for that channel, said means also generating a signal at said level in response to interference or fading of certain magnitudes at the respective signal frequency for that channel; and means responsive to the signal levels generated by said means in each channel for indicating the probable value of the binary information transmitted in a given time interval on the basis of majority agreement of the generated signal levels for all of said channels during the corresponding time interval for the received signal frequencies.

7. The receiver system according to claim 6 wherein is further included means responsive to the absence of majority agreement of the generated signal levels for forcing said indicating means to indicate a predetermined one of said values as the probable value of the binary information.

8. A digital decision device for use in a time diversity receiver system wherein at least two pairs of channels are provided, with each of said pairs of channels being located with respect to a source of signals such that the transmissions between the source and each of the pairs of channels are subjected to independent fading and interference patterns, and wherein the source transmits for each unit of information one of two signals of frequencies $f_1$ and $f_2$ spaced in the frequency spectrum such as to be subjected to independent fading and interference patterns, the signal of frequency $f_2$ being undelayed and signal of frequency $f_1$ being delayed at the source, said receiver comprising a first channel of each of said pairs of channels for receiving signal $f_1$, second channels of each of said pairs of channels receiving signal $f_2$, a delay means for each of said second channels having a time delay equal to the time delay imparted to signal $f_1$ at the source of signals, means associated with each of said channels for deriving distinct indications representing the presence and absence, respectively, of a signal of the frequency associated with said channel, means for producing first and second output indications to represent receipt by said receiver system of a majority of signals of frequency $f_1$ and $f_2$, respectively, means producing a further signal indicative of receipt of equal numbers of signals $f_1$ and $f_2$ by said receiver system, a threshold detector producing a first indication when a signal applied thereto has an amplitude which crosses a predetermined threshold and producing a second indication when a signal applied thereto has an amplitude which remains on one side of the predetermined threshold, means responsive to said further signal for applying signal $f_1$ appearing on one of said first channels to said threshold detector, means responsive to said threshold detector deriving said second indication for producing an output indication from said receiver system indicative of the signal condition in said first channel of one of said pairs of channels and means responsive to said threshold detector generating said first indication for producing an output indication from said receiver signal indicative of the signal condition of said first channel of another pair of said pairs of channels.

9. A digital decision device for use in a time diversity receiver system wherein at least two pairs of channels are provided, with each of said pairs of channels being located with respect to a source of signals such that the transmissions between the source and each of the pairs of channels are subjected to independent fading and interference patterns, and wherein the source transmits for each unit of information one of two signals of frequencies $f_1$ and $f_2$ spaced in the frequency spectrum such as to be subjected to independent fading and interference patterns, the signal of frequency $f_2$ being undelayed and signal of frequency $f_1$ being delayed at the source, said receiver comprising a first channel of each of said pairs of channels for receiving signal $f_1$, second channels of each of said pairs of channels receiving signal $f_2$, a delay means for each of said second channels having a time delay equal to the time delay imparted to signal $f_1$ at the source of signals, means associated with each of said channels for deriving distinct indications representing the presence and absence, respectively, of a signal of the frequency associated with said channel, means for producing first and second output indications to represent receipt by said receiver system of a majority of signals of frequencies $f_1$ and $f_2$, respectively, means producing a further signal indicative of receipt of equal numbers of signals $f_1$ and $f_2$ by said receiver system, and means responsive to said further signal for producing an output signal from said receiver system indicative of a signal applied to one of said first channels.

References Cited

UNITED STATES PATENTS

| | | | |
|---|---|---|---|
| 2,803,703 | 8/1957 | Sherwin | 178—70 |
| 3,239,761 | 2/1966 | Goode | 325—40 X |
| 3,270,285 | 8/1966 | Thomas | 325—56 X |

ROBERT L. GRIFFIN, *Primary Examiner.*

WILLIAM S. FROMMER, *Assistant Examiner.*

U.S. Cl. X.R.

178—88; 325—56, 304